US 6,678,309 B1

(12) United States Patent
Kitahara

(10) Patent No.: US 6,678,309 B1
(45) Date of Patent: Jan. 13, 2004

(54) CDMA BASE STATION SYSTEM

(75) Inventor: Minako Kitahara, Sendai (JP)

(73) Assignee: Kokusai Electric Co., Ltd., Tokyo (JP)

( * ) Notice: Subject to any disclaimer, the term of this patent is extended or adjusted under 35 U.S.C. 154(b) by 653 days.

(21) Appl. No.: 09/618,643

(22) Filed: Jul. 18, 2000

(30) Foreign Application Priority Data

Jul. 19, 1999  (JP) .......................................... 11-204331

(51) Int. Cl.[7] .......................... H04B 15/00; H04K 1/00; H04L 27/30
(52) U.S. Cl. ....................... 375/144; 375/130; 455/522; 455/25
(58) Field of Search .......................... 455/25, 522, 562, 455/63, 101; 342/359, 367; 375/144, 130, 148, 224, 285, 260, 259, 346, 348, 349

(56) References Cited

U.S. PATENT DOCUMENTS

| | | | |
|---|---|---|---|
| 5,745,858 | * 4/1998 | Sato et al. ............... | 455/562.1 |
| 5,907,303 | * 5/1999 | Yukitomo et al. .......... | 342/380 |
| 6,064,338 | * 5/2000 | Kobayakawa et al. ...... | 342/378 |
| 6,128,276 | * 10/2000 | Agee .......................... | 370/208 |
| 6,446,025 | * 9/2002 | Nakamura et al. .......... | 702/159 |
| 2002/0012333 | * 1/2002 | Yoshida et al. ............. | 370/335 |

* cited by examiner

*Primary Examiner*—Jean B. Corrielus
(74) *Attorney, Agent, or Firm*—Wenderoth, Lind & Ponack, L.L.P.

(57) ABSTRACT

A reference signal detecting device detects, as a reference signal, a signal received from a transmission partner corresponding to a transmission power equal to or higher than a predetermined threshold value, and a compensation-free signal detecting device detects, as compensation-free signals, signals received from other mobile station systems corresponding to a transmission power equal to or higher than a transmission power corresponding to the transmission partner. A transmitting device transmits a signal using transmission weights based on reception weights to reduce the reception level of another signal than the reference signal and the compensation-free signals and increase the reception level of the reference signal.

11 Claims, 5 Drawing Sheets

FIG. 4

| ANGLE | SECTOR ANTENNA PATTERN | CONVENTIONAL PATTERN | INVENTIVE PATTERN |
|---|---|---|---|
| −30° | −0.72dB | −15.3dB | −23.5dB |
| 20° | −0.31dB | −1.4dB | −16.3dB |
| 40° | −1.29dB | 6.9dB | −20.2dB |
| 50° | −2.05dB | 6.0dB | −23.5dB |

CDMA BASE STATION SYSTEM

BACKGROUND OF THE INVENTION

1. Field of the Invention

The present invention relates to a CDMA base station system for controlling the directivity of a plurality of antennas as a whole and transmitting a spread signal to a mobile station system with the transmission power depending on the mobile station system, and more particularly to a CDMA base station system having such transmission directivity characteristics as to reduce interference given to a relatively interference-susceptible mobile station system to a level lower than a conventional level.

2. Description of the Related Art

Efforts are being made to study DS-CDMA systems as radio transmission systems according to the IMT-2000 standardization process. In a radio communication system based on DS-CDMA principles, different spreading codes are assigned to respective mobile station systems. In a CDMA base station system, a received signal is despread using a spreading code assigned to a certain mobile station system for thereby separating the signal destined for the mobile station system from the received signal, and a signal spread using a spreading code assigned to a certain mobile station system is transmitted to the mobile station system.

The radio communication system based on DS-CDMA principles allows a plurality of mobile station systems to share one frequency band by using the above spreading codes. However, since the same frequency band is shared by plural mobile station systems, a spread signal transmitted to and from a certain mobile station system serves as an interference signal for a spread signal transmitted to and from another mobile station system. Therefore, if a multirate service is provided using a DS-CDMA system, then it has been proposed to provide a CDMA base station system with an adaptive antenna array for interference removal. The proposed elimination of interference with an adaptive antenna array will be described below.

The multirate service provided as a DC-CDMA feature is a service which allows the user to obtain a plurality of communication rates. The multirate service can offer voice communications similar to conventional voice communications, and can also transmit high-bit-rate data and image data using a high communication rate.

The adaptive antenna array comprises a plurality of antennas whose overall directivity can be controlled. Specifically, a reception weight or a transmission weight is given to each of the antennas for controlling the directivity upon reception (reception directivity) and the directivity upon transmission (transmission directivity).

In the multirate service, generally, the power level of a signal is greater as the communication rate of the signal is higher. Therefore, when a signal having a relatively high communication rate (high-rate user signal) and a signal having a relatively low communication rate (low-rate user signal) are simultaneously transmitted from a plurality of mobile station systems, the high-rate user signal interferes with the low-rate user signal. To solve this problem, it has been proposed to provide a CDMA base station system with an adaptive antenna array for interference removal upon signal reception. For example, prior proposed attempts are disclosed in "IEICE Trans. Fundamentals, vol. E80-A, no. 12, pp. 2445–2454, December 1997, S. Tanaka, M. Sawahishi, and F. Adachi", and "IEEE VTC99-Conf. Rec., vol. 1, pp. 243–248, May 1999, S. Tanaka, A. Harada, M. Sawahishi, and F. Adachi".

For interference removal upon signal reception by the CDMA base station system, the reception weights of the adaptive array antenna are controlled to achieve a reception directivity for preferentially attenuating a reception interference signal having a large power level. For example, if a high-rate user signal and a low-rate user signal are present as interference signals other than a signal that is desired to be received, then the high-rate user signal as an interference signal having a relatively large power level is preferentially attenuated, thus improving signal reception characteristics.

It has also been proposed to improve signal transmission characteristics by controlling the transmission weights of an adaptive antenna array with a CDMA base station system not only for uplink communications from mobile station systems to the CDMA base station system but also for downlink communications from the CDMA base station system to mobile station systems. One proposal is disclosed in "IEICE Technical Report, RCS99–18, May 1999, Harada, Tanaka, Sawahashi, and Adachi", for example.

Specifically, there has been studied a CDMA base station system for controlling the transmission directivity of an adaptive array antenna using transmission weights based on the reception weights that were obtained for interference removal upon signal reception. The transmission weights based on the reception weights are weights obtained by effecting a calibration process on the reception weights. The calibration process serves to remove effects due to the difference per antenna between the complex amplitude characteristics of an RF receiver and the complex amplitude characteristics of an RF transmitter in the CDMA base station system.

If the transmission directivity of an adaptive array antenna is controlled using transmission weights based on the reception weights, as described above, then since more priority is given to the reduction of interference imposed on a mobile station system (high-rate user) which transmits and sends a high-rate user signal, i.e., a signal having a relatively large power level, than a mobile station system (low-rate user) which transmits and sends a low-rate user signal, i.e., a signal having a relatively small power level, the signal reception characteristics of the low-rate user that is more susceptible to interference than the high-rate user are largely deteriorated.

Stated otherwise, although the transmission directivity of the adaptive array antenna actually needs to be controlled in order to preferentially lower the antenna gain in the direction of the low-rate user for the downlink, it has heretofore been customary to preferentially use the freedom of the adaptive antenna array so as to lower the antenna gain in a multipath direction of the high-rate user signal, for example. Consequently, it is highly difficult to lower interference imposed on the low-rate user. This difficulty manifests itself particularly if many low- and high-rate users are present compared with the freedom of the adaptive antenna array.

One way of determining the reception directivity of the adaptive array antenna with the CDMA base station system has been to employ an MMSE (Minimum Mean Square Errors) control process for determining reception weights in a manner to minimize the power levels of received signals other than a desired received signal. If the desired received signal arrives at the CDMA base station system via a plurality of paths in a multipath environment, then a signal that is received at an earliest time (leading wave) among multipath signals received by the CDMA base station system via the plural paths is selected as a reference signal, and reception weights are determined in order to minimize the power levels of received signals other than the reference signal.

However, the leading wave among the signals received by the CDMA base station system via the plural paths may not necessarily arrive at the CDMA base station system via the path whose power loss is minimum. Accordingly, the determined reception weights may not be optimum.

Specific examples of reception adaptive array antenna devices are revealed in "IEEE Trans. Information Theory, vol. IT-32, no. 2, pp. 195–219, March 1986, J. W. Modestino and V. M. Eyuboglu" and "IEICE Technical Report, A.P97–146, November 1997, Kazuhiko Fukawa", for example. In the disclosed reception adaptive array antenna devices, the position (time) of a multipath wave selected as a reference signal is fixed in advance, failing to employ reception weights that are optimum at all times.

In the above various conventional arrangements, the power of the signal transmitted from the CDMA base station system to the mobile station system differs from communication rate to communication rate. The shortcomings described above also arise when the transmission power is controlled depending on the distance by which a CDMA base station system is spaced from a mobile station system, as described below.

The CDMA base station system which performs transmission power control transmits a signal to the mobile station system with a power that is greater as the distance from the CDMA base station system to the mobile station system is larger. Therefore, all mobile station systems are capable of receiving signals from the CDMA base station system at the same power level regardless of the distances by which the mobile station systems are spaced from the CDMA base station system. If the mobile station systems perform similar transmission power control, the CDMA base station system can receive signals from the mobile station systems at the same power level.

If the CDMA base station system can receive signals from the mobile station systems at the same power level, then when the CDMA base station system controls the transmission directivity of the adaptive array antenna using transmission weights based on the reception weights used for signal reception, the transmission directivity control process does not preferentially use the freedom of the adaptive array antenna so as to preferentially lower the interference imposed on either one of the mobile station systems.

However, because a mobile station system which is spaced from the CDMA base station system by a relatively small distance, i.e., a short-distance user, is affected more greatly by the interference due to a signal transmitted from the CDMA base station system to another mobile station system than a mobile station system which is spaced from the CDMA base station system by a relatively large distance, i.e., a long-distance user, the above transmission directivity control process tends to greatly deteriorate the reception characteristics of the short-distance user.

As described above, inasmuch as the conventional CDMA base station system controls the transmission directivity of the adaptive array antenna using transmission weights based on the reception weights that preferentially lower a reception interference signal having a large power level, the interference imposed on relatively interference-susceptible mobile station systems, e.g., low-rate users or short-distance users, becomes large, largely deteriorating the reception characteristics of those relatively interference-susceptible mobile station systems.

When the conventional CDMA base station system carries out the MMSE control process in a multipath environment, for example, since the leading wave is selected as the reference signal, there are occasions where optimum weights may not be determined.

SUMMARY OF THE INVENTION

It is an object of the present invention to provide a CDMA base station system which receives spread signals transmitted from mobile station systems with a plurality of antennas and gives transmission weights respectively to the antennas to control the overall directivity of the antennas for preferentially lowering the interference imposed on relatively interference-susceptible mobile station systems when transmitting a spread signal to a mobile station system with the transmission power that corresponds to the mobile station system.

Another object of the present invention is to provide a CDMA base station system which is capable of employing optimum transmission weights by selecting an optimum reference signal at all times in controlling the transmission directivity according to an MMSE control process in a multipath environment where a spread signal transmitted from a mobile station system is received via a plurality of paths.

To achieve the above objects, a CDMA base station system according to an aspect of the present invention receives a spread signal transmitted from a mobile station system with a plurality of antennas, imparts transmission weights to the respective antennas for controlling the overall directivity of the antennas, and transmits a spread signal to a mobile station system as a transmission partner with a transmission power corresponding to the mobile station system as a transmission partner. The CDMA base station system transmits the spread signal using transmission weights that are determined as described below. It is assumed that the transmission power corresponding to the mobile station system as a transmission partner is equal to or greater than a predetermined threshold value, i.e., a mobile station system corresponding to the same transmission power as the transmission power corresponding to the mobile station system as a transmission partner is relatively resistant to interference.

In the above CDMA base station system, reference signal detecting means detects, as a reference signal, a signal received from a mobile station system as a transmission partner corresponding to a transmission power equal to or higher than a predetermined threshold value, compensation-free signal detecting means detects, as compensation-free signals, signals received from other mobile station systems corresponding to transmission powers which are higher than the transmission power corresponding to the mobile station system as a transmission partner, and transmission means calculates transmission weights based on reception weights of the antennas in order to reduce the reception level of another signal than the detected reference signal and the detected compensation-free signals and increase the reception level of the reference signal, and transmits a spread signal to the mobile station system as a transmission partner using the calculated transmission weights.

Using the above transmission weights, a signal can be transmitted at a large power level to the mobile station system as a transmission partner, and can be transmitted at a small power level to a mobile station system corresponding to a transmission power smaller than the transmission power corresponding to the mobile station system as a transmission partner. Therefore, the interference imposed on a mobile station system corresponding to a relatively small transmission power, i.e., a relatively interference-susceptible mobile station system, can preferentially be reduced.

The transmission weights of the respective antennas comprise adjusted values of amplitude and phase of a spread signal that is to be transmitted from the antennas. However, the transmission weights may not necessarily be adjusted values of both amplitude and phase, but may be adjusted values of amplitude only or adjusted values of phase adjusted values of both amplitude and phase only. The CDMA base station system imparts those transmission weights to the respective antennas for thereby allowing the overall antennas to achieve a transmission directivity depending on the transmission weights.

The transmission weights may be calculated directly without calculating reception weights, or may be calculated based on reception weights after the reception weights have been calculated.

If the transmission weights are calculated based on reception weights after the reception weights have been calculated, then the reception weights may comprise the above adjusted values, as with the transmission weights. Since the reception weights represent a concept for calculating transmission weights, any reception weights may be used for actual signal reception. Usually, the reception weights according to the present invention are not used for actual signal reception, but different reception weights preferred for actual signal reception are used for actual signal reception.

According to another aspect of the present invention, a CDMA base station system receives a spread signal transmitted from a mobile station system with a plurality of antennas, imparts transmission weights to the respective antennas for controlling the overall directivity of the antennas, and transmits a spread signal to a mobile station system as a transmission partner with a transmission power corresponding to the mobile station system as a transmission partner. The CDMA base station system transmits the spread signal using transmission weights that are determined as described below. It is assumed that the transmission power corresponding to the mobile station system as a transmission partner is smaller than a predetermined threshold value, i.e., a mobile station system corresponding to the same transmission power as the transmission power corresponding to the mobile station system as a transmission partner is relatively susceptible to interference.

In the above CDMA base station system, reference signal detecting means detects, as a reference signal, a signal received from a mobile station system as a transmission partner corresponding to a transmission power smaller than a predetermined threshold value, compensation-free signal detecting means detects, as compensation-free signals, signals received from other mobile station systems corresponding to transmission powers which are higher than the transmission power corresponding to the mobile station system as a transmission partner, and transmission means calculates transmission weights based on reception weights of the antennas in order to reduce the reception level of another signal than the detected reference signal and the detected compensation-free signals and increase the reception level of the reference signal, and transmits a spread signal to the mobile station system as a transmission partner using the calculated transmission weights.

Using the above transmission weights, a signal can be transmitted at a large power level to the mobile station system as a transmission partner, and can be transmitted at a small power level to a mobile station system corresponding to a transmission power equal to or smaller than the transmission power corresponding to the mobile station system as a transmission partner. Therefore, the interference imposed on a mobile station system corresponding to a relatively small transmission power, i.e., a relatively interference-susceptible mobile station system, can preferentially be reduced.

The transmission weights and the reception weights are the same as those described above.

The CDMA base station system is used for communications in a multipath environment where a spread signal transmitted from a mobile station system as a transmission partner is received via a plurality of paths. The reference signal detecting means comprises means for detecting, as a reference signal, a signal whose reception power is maximum among signals received from the mobile station system as a transmission partner is received via the paths, and the compensation-free signal detecting means comprises means for detecting signals other than the signal detected as a reference signal among signals received via the paths from the mobile station system as a transmission partner, as being included in the compensation-free signals.

Since a signal whose reception power is maximum among multipath signals received via the plural paths, i.e., a signal received via the best path whose power loss is minimum, is selected as a reference signal, it is possible to calculate the best transmission weights at all times for signal transmission.

The CDMA base station system is used for communications in a multipath environment where a spread signal transmitted from a mobile station system as a reception partner is received via a plurality of paths. In the CDMA base station system, reception reference signal detecting means detects, as a reception reference signal, a signal whose reception power is maximum among signals received from a mobile station system as a reception partner is received via the paths, and reception means calculates reception weights of the respective antennas in order to reduce the reception level of another signal than the detected reception reference signal and increase the reception level of the reception reference signal, and receives a spread signal from the mobile station system as a reception partner using the calculated reception weights. The reception weights comprise reception weights that are used for actual signal reception.

Using the above reception weights, a signal can be received at a large reception level from the mobile station system as a reception partner. For receiving a signal from another mobile station system at a small reception level, a signal whose reception level is maximum among multipath signals received from the mobile station system as a reception partner via the plural paths is selected as a reception reference signal. Consequently, as with the above transmission weights, best reception weights can be calculated at all times for signal reception.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a diagram showing the result of a simulation of interference reductions in the directions of low-rate user signals.

DETAILED DESCRIPTION OF THE PREFERRED EMBODIMENT

Figure 1:
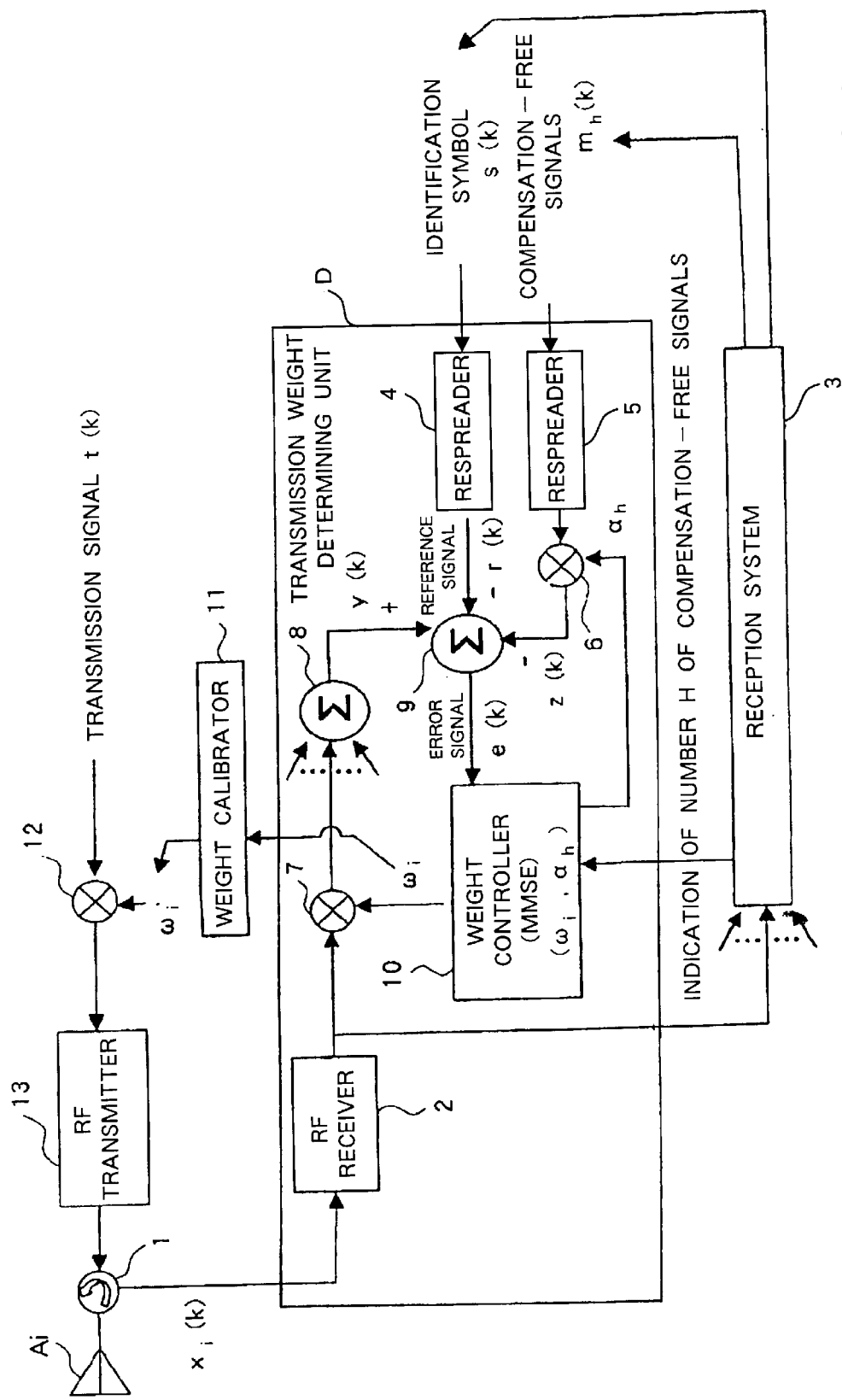
FIG. 1 is a block diagram of a CDMA base station system according to the present invention.

As shown in FIG. 1, a CDMA base station system according to the present invention which comprises an antenna Ai, a duplexer 1, a reception system 3, a transmission weight determining unit D, a weight calibrator 11, a multiplier 12 for processing a transmission signal, and an RF transmitter 13. The transmission weight determining unit D has an RF receiver 2, a respreader 4 for processing an identification symbol, a respreader 5 and a multiplier 6 for processing a compensation-free signal, a multiplier 7 and an adder 8 for processing a reception signal, an adder 9 for calculating an error signal, and a weight controller 10 for performing an MMSE control process.

The antenna Ai is an ith antenna of a plurality of antennas that make up an adaptive array antenna. The antenna Ai receives a spread signal transmitted from a mobile station system via a radio link and outputs the received spread signal to the duplexer 1, and transmits a spread signal supplied from the duplexer 1 to a mobile station system via a radio link. It is assumed that the total number of antennas of the adaptive array antenna of the CDMA base station system is N (i=1 to N).

In FIG. 1, the other antennas than the ith antenna Ai are omitted from illustration. Arrangements for processing signals transmitted and received by the other antennas than the ith antenna Ai are omitted from illustration or simplified. Those arrangements for processing signals transmitted and received by the other antennas than the ith antenna Ai are identical to the arrangement for processing signals transmitted and received by the ith antenna Ai, for example.

The duplexer 1 outputs a signal supplied from the antenna Ai to the RF receiver 2, and outputs a signal supplied from the RF transmitter 13 to the antenna Ai. Therefore, the duplexer 1 allows the same antenna Ai to be shared by the transmission and reception of signals.

The RF receiver 2 converts a signal xi(k) received by the antenna Ai and supplied via the duplexer 1 from an RF band into a base band, and outputs the converted signal xi(k) to the reception system 3 and the multiplexer 7. The symbol "(k)" in the signal xi(k) indicates that the signal value xi is a function of time k. The meaning of the symbol "(k)" remains the same in the description that follows.

The reception system 3 may have the above function of the RF receiver 2.

Signals x1(k)–xN(k) received by the respective antennas A1–AN are inputted as base band signals to the reception system 3. The reception system 3 multiplies the supplied N signals x1(k)–xN(k) by respective reception weights, and totals the products for thereby controlling the reception directivity suitable to receive a desired signal and receiving the desired signal. The reception directivity may be controlled using the reception weights in the same manner as described above with respect to the conventional arrangements.

It is assumed that the CDMA base station system is used in a multipath environment where a spread signal transmitted from a mobile station system as a communication partner is received via a plurality of paths and a spread signal transmitted from the CDMA base station system travels via a plurality of paths to a mobile station system as a transmission partner.

For performing efficient communications in such a multipath environment, the reception system 3 is capable of separating a signal xi(k) supplied from the RF receiver 2 into signals for the respective paths, and combining the same signals received via the respective paths by way of RAKE combination. Each of the mobile station systems is also capable of combining the same signals transmitted from the CDMA base station system by way of RAKE combination.

The reception system 3 outputs a signal received from a mobile station system as a transmission partner as an identification symbol s(k) to the respreader 4, and also outputs a signal received from a relatively interference-resistant mobile station system other than the mobile station as a transmission partner, as a compensation-free signal mh(k) to the respreader 5. In this embodiment, since a signal transmitted from the mobile station system as a transmission partner is received via a plurality of paths, the reception system 3 selects one of the same signals received via the plural paths as an identification symbol s(k) at the signal input side of a RAKE combiner, for example, and includes signals (multipath signals) other than the signal selected as the identification symbol s(k) in the compensation-free signal mh(k) and outputs the compensation-free signal mh(k) including those signals.

Similarly, since a signal transmitted from the relatively interference-resistant mobile station system is also received via a plurality of paths by the CDMA base station system, the reception system 3 includes all signals (multipath signals) received via the plural paths in the compensation-free signal mh(k) and outputs the compensation-free signal mh(k) including those signals.

The compensation-free signal mh(k) including the multipath signals can be detected at the signal input side of a RAKE combiner in the reception system 3, for example.

Any arbitrary signal may be selected as an identification symbol s(k) from the same signals received from a mobile station system as a transmission partner via a plurality of paths. Preferably, the reception system 3 selects a signal whose average power is the greatest at the signal input side of the RAKE combiner as an identification symbol s(k).

The reception system also indicates the total number H of compensation-free signals mh(k) (the number of compensation-free signals) to the weight controller 10 of the transmission weight determining unit D (h=1 to H).

The respreader 4 respreads an identification symbol s(k) supplied from the reception system 3, using a spreading code, and outputs a produced spread signal as a reference signal r(k) to the adder 9.

The respreader 4 respreads each compensation-free signal mh(k) supplied from the reception system 3, using a spreading code, and outputs a respread compensation-free signal (spread signal) mh(k) to the multiplier 6.

For example, the spreading code used to respread the identification symbol s(k) is the same as the spreading code used to obtain the identification symbol s(k) with the reception system 3 by way of despreading, and, similarly, the spreading code used to respread each compensation-free signal mh(k) is the same as the spreading code used to obtain the compensation-free signal mh(k) with the reception system 3 by way of despreading. If QPSK spreading is performed, then the same spreading code as the spreading code used in despreading is used for I phase, but a spreading code which is an inversion of the spreading code used in despreading is used for Q phase.

The multiplier 6 multiplies each compensation-free signal mh(k) supplied from the respreader 5 by a complex amplitude αh, and outputs a sum signal z(k) (=Σ{mh(k)×αh}) of the products to the adder 9. The complex amplitude αh is outputted from the weight controller 10 (described later on), and corresponds to each compensation-free signal mh(k).

The multiplier 7 multiplies a signal xi(k) supplied from the RF receiver 2 by a controlling weight ωi, and outputs the product to the adder 8. The controlling weight ωi is outputted from the weight controller 10, and corresponds to the signal xi(k) received by the antenna Ai.

The adder 8 is supplied with the products of signals x1(k)–xN(k) from the respective antennas A1–AN and controlling weights ω1–ωN, with respect to all the antennas A1–AN. The adder 8 totals the supplied N products, and outputs the sum y(k) to the adder 9.

The adder 9 is supplied with the reference signal r(k) from the respreader 4, the sum signal z(k) from the multiplier 6, and the sum y(k) from the adder 8. The adder 9 subtracts the sum of the reference signal r(k) and the sum signal z(k) from the sum y(k), and outputs a resultant signal as an error signal e(k) (=y(k)−r(k)−z(k)) to the weight controller 10. The error signal e(k) may have its sign inverted, i.e., the error signal e(k) may be represented by e(k) (=r(k)+z(k)−y(k)).

The weight controller 10 successively updates the controlling weight ωi to be outputted to the multiplier 7 and the complex amplitude αh to be outputted to the multiplier 6 based on the number H of compensation-free signals indicated by the reception system 3 and the error signal e(k) supplied from the adder 9, for thereby calculating controlling weights ω1–ωN and complex amplitudes α1–αH for minimizing the power of the error signal e(k). The weight controller 10 performs an MMSE control process expanded by the number H of compensation-free signals indicated by the reception system 3, i.e., an MMSE control process where the freedom of the array pattern is saved, for thereby carrying out the above calculations. In the present embodiment, as described above, the controlling weights ω1–ωN are determined using the signal outputted from the RF receiver 2, i.e., the signal prior to being despread.

If the controlling weights ω1–ωN thus calculated are regarded as the reception weights for the adaptive array antenna, then the reception weights are capable of achieving a high reception level of the reference signal r(k), i.e., a high reception level corresponding to the level of the identification symbol s(k) outputted from the reception system 3, and also achieving a low reception level of the error signal e(k), or preferably, a minimum reception level of the error signal e(k).

If transmission weights based on the controlling weights ω1–ωN are used, then a transmission directivity can be realized for transmitting a signal at a relatively large power level in the direction in which the reference signal r(k) is received, and also for transmitting a signal at a relatively small power level in the direction in which a signal contained in the error signal e(k) is received. Therefore, by using those transmission weights, a signal can be transmitted at a relatively large power level to a mobile station system as a transmission partner, and a signal can be transmitted at a relatively small power level to a relatively interference-susceptible mobile station system.

The reason why the interference imposed on a relatively interference-susceptible mobile station system can preferentially be reduced is that multipath signals other than the reference signal r(k) received from the mobile station system as a transmission partner and multipath signals received from another relatively interference-resistant mobile station system do not remain as compensation-free signals mh(k) in the error signal e(k). Stated otherwise, by not using the freedom of the array pattern to lower, e.g., direct nulls to, the antenna gain for transmission in the direction in which the compensation-free signals mh(k) are received, the freedom of the array pattern can preferentially be used to lower the antenna gain for transmission to a relatively interference-susceptible mobile station system.

An example of theoretical equations with respect to the MMSE control process are shown below.

The MMSE control process employs an expanded input signal vector X(k) represented by the equation (1) and an expanded weight vector W represented by the equation (2). In equations (1) and (2), X(k) and W indicate vectors, "T" indicate a transposition, and x1(k)–xN(k), m1(k)–mH(k), ω1–ωN, and α1–αN indicate the reception signal xi(k), the compensation-free signal mh(k), the controlling weight ωi, and the complex amplitude αh, respectively.

$$X(k) = \{x1(k), \ldots, xN(k), m1(k), \ldots, mH(k)\}^T \quad (1)$$

$$W = \{\omega1, \ldots, \omega N, \alpha1, \ldots, \alpha N\}^T \quad (2)$$

The Wiener solution of the above expanded weight vector W is represented by equations (3) through (5) shown below. In the equations (3) through (5), "·" indicates a multiplication, "*" indicates a complex conjugate, "E[ ]" indicates an ensemble average within the brackets [ ], and r(k) indicates the reference signal r(k).

$$W = (Rxx)^{-1} \cdot (Vxr) \quad (3)$$

$$Rxx = E[(X(k))^* \cdot (X(k))^T] \quad (4)$$

$$Vxr = E[(X(k))^* \cdot (r(k))^T] \quad (5)$$

The weight controller 10 outputs the controlling weights ω1–ωN calculated to minimize the power of the error signal e(k) to the weight calibrator 11.

The weight calibrator 11 performs a predetermined calibrating process on the controlling weights ω1–ωN supplied from the weight controller 10, and outputs produced N weights as transmission weights ω'1–ω'N to multipliers associated respectively with the antennas A1–AN. In FIG. 1, only the multiplier 12 associated with the ith antenna Ai is shown, and the multiplier 12 is supplied with the transmission weight ω'1 corresponding to the ith antenna Ai.

The calibrating process is a process of removing the effect due to the different complex amplitude characteristics of the RF receiver 2 and the different complex amplitude characteristics of the RF transmitter 13 associated with the antennas A1–AN. If the calibrating process is not required, then the controlling weights ω1–ωN supplied from the weight controller 10 are used directly as the transmission weights ω1–ωN.

The multiplier 12 is supplied with a signal (transmission signal) t(k) to be transmitted to a mobile station system as a transmission partner, and also with a transmission weight ω'i from the weight calibrator 11. The multiplier 12 multiplies the transmission signal t(k) by the transmission weight ω'i, and outputs the product to the RF transmitter 13. The transmission signal t(k) multiplied by the transmission weight ω'i has its amplitude and phase adjusted depending on the transmission weight ω'i.

The RF transmitter 13 converts the signal supplied from the multiplier 12 from a base band into an RF band, and outputs the converted signal to the duplexer 1. The signal outputted to the duplexer 1 is transmitted from the antenna Ai via a radio link.

The function of the RF transmitter 13 may be provided in a stage that precedes the multiplier 12. In such a modification, the transmission signal t(k) is multiplied by the transmission weight ω'i after it has been converted from a base band into an RF band.

In the CDMA base station system, as described above, based on a signal received by the adaptive array antenna, it is possible to determine transmission weights ω'1–ω'N capable of transmitting a signal at a relatively large power level in the direction in which the reference signal r(k) is received, and also of transmitting a signal at a relatively small power level in the direction in which a signal contained in the error signal e(k) is received. Therefore, by transmitting a signal to a mobile station system as a transmission partner from the adaptive array antenna using the transmission weights ω'1–ω'N, the interference imposed on a relatively interference-susceptible mobile station system can be reduced.

According to the MMSE control process performed by the CDMA base station system, the freedom of the array pattern is not used to lower the power level of a signal transmitted in the direction in which each compensation-free signal mh(k) is received. However, since the mobile station system which has transmitted each compensation-free signal mh(k) is performing communications that are relatively resistant to interference, any deterioration of the reception characteristics of the mobile station system due to the effect of interference is small even if the transmission weights ω'1–ω'N are used.

A specific sequence of a process of determining transmission weights carried out by the CDMA base station system will be described below.

It is assumed that a relatively interference-resistant mobile station system and a relatively interference-susceptible mobile station system are present in a communication range of the CDMA base station system. As specific modes of operation, a radio communication system made up of the CDMA base station system and the mobile station systems carries out a multirate service, and both the CDMA base station system and the mobile station systems perform a transmission power control process.

The multirate service as a mode of operation will be described below.

Of communication rates that can be used for communications, a relatively low rate is referred to as a "low rate", and a relatively high rate is referred to as a "high rate". The transmission power of a signal transmitted at a high communication rate, i.e., a high-rate user signal, from the CDMA base station system to a mobile station system is greater than the transmission power of a signal transmitted at a low communication rate, i.e., a low-rate user signal. Therefore, a mobile station system which transmits and receives a high-rate user signal, i.e., a high-rate user, is more resistant to interference, i.e., less susceptible to interference, than a mobile station system which transmits and receives a low-rate user signal, i.e., a low-rate user.

In the above multirate service, a mobile station system as a transmission partner of the CDMA base station system may possibly be either a high-rate user or a low-rate user. These two alternatives will be described below.

Figure 2:
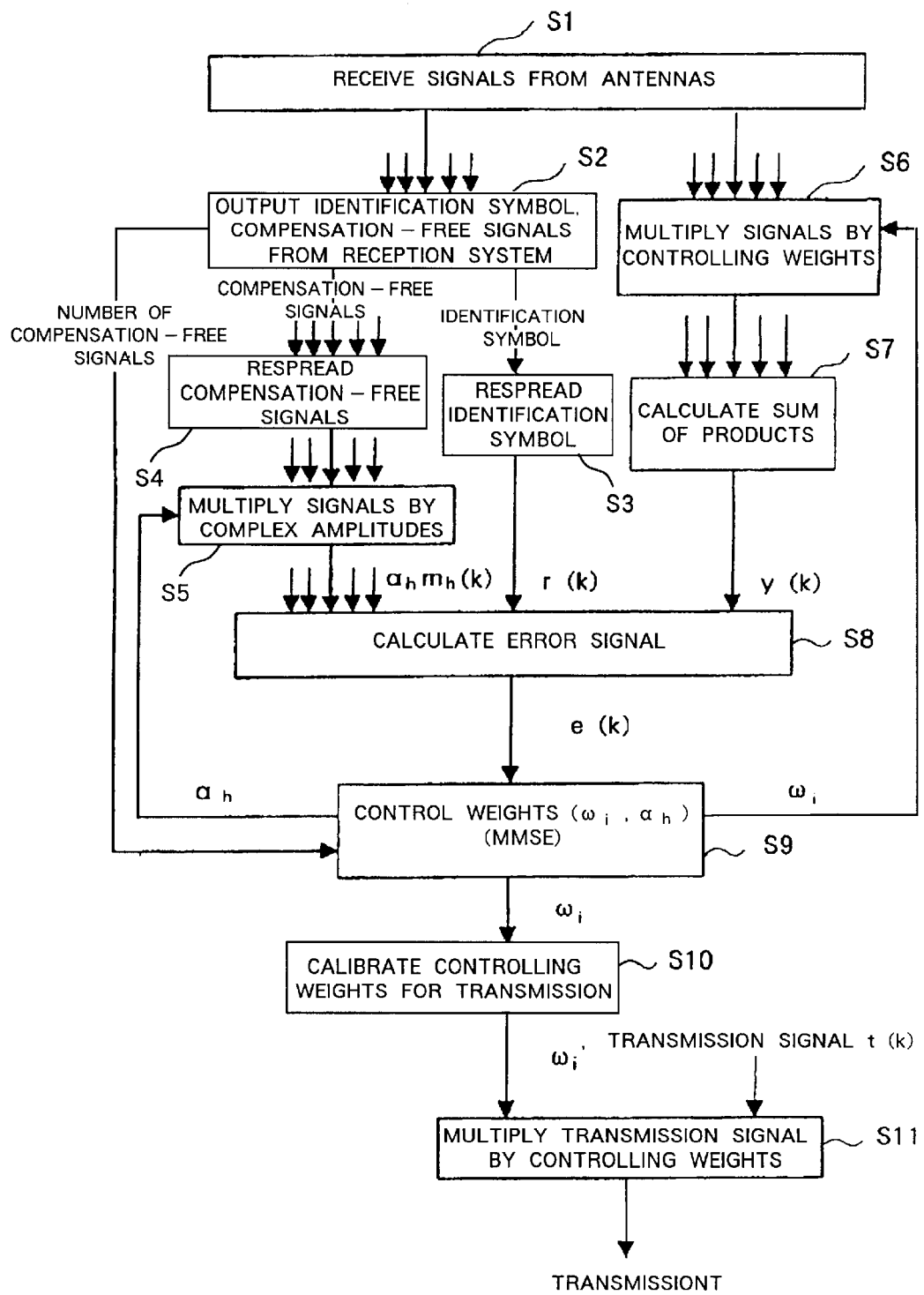
FIG. 2 is a flowchart of a processing sequence carried out by the CDMA base station system.

First, operation of the CDMA base station system when a mobile station system as a transmission partner of the CDMA base station system is a high-rate user will be described below. FIG. 2 shows a processing sequence carried out by the CDMA base station system according to the present invention. Operation of the CDMA base station system will be described below with reference to FIG. 2.

Signals x1(k)–xN(k) received by the respective antennas A1–AN are outputted via the duplexer 1 to the RF receiver 2 in step S1. Then, the signals x1(k)–xN(k) are frequency-converted by the RF receiver 2 and then received by the reception system 3 by way of RAKE reception, and the reception system 3 outputs an identification symbol s(k) and compensation-free signals mh(k) in step S2.

For the identification symbol s(k), a signal having largest average power is selected among high-rate user signals received via a plurality of paths from a mobile station system as a transmission partner. For compensation-free signals mh(k), signals (multipath signals) other than a signal selected as a reference signal among high-rate user signals received via the plurality of paths from the mobile station system as a transmission partner are selected, and signals (including multipath signals) received from all other mobile station systems which communicate at communication rates higher than the communication rate of the mobile station system as a transmission partner are selected.

The identification symbol s(k) is respread into a reference signal r(k) by the respreader 4 in step S3. After the compensation-free signals m1(k)–mH(k) are respread by the respreader 5 in step S4, they are multiplied by complex amplitudes α1–αH and their products are totaled in step S5. In synchronism with the above reception and respreading processing in steps S2–S5, the signals x1(k)–xN(k) received by the respective antennas A1–AN are multiplied by controlling weights ω1–ωN in step S6, and the sum y(k) of the products is calculated by the adder 8 in step S7.

The adder 9 calculates an error signal e(k) based on the reference signal r(k) from the respreader 4, the sum signal z(k) from the multiplier 6, and the sum y(k) from the adder 8, and outputs the error signal e(k) to the weight controller 10 in step S8.

The weight controller 10 successively updates the controlling weights ω1–ωN and the complex amplitudes α1αH according to a predetermined setting in the MMSE control process, thus determining controlling weights ω1–ωN to minimize the power of the error signal e(k), and outputs the determined controlling weights ω1–ωN to the weight calibrator 11 in step S9.

The weight calibrator 11 calculates controlling weights ω'1–ω'N based on the determined controlling weights ω1–ωN in step S10. A transmission signal t(k) to be transmitted is multiplied by the calculated controlling weights ω'1–ω'N, and resultant product signals are transmitted via the RF transmitter 13 and the duplexer 1 from the antennas A1–AN in step S11.

According to the above multirate service, the CDMA base station system is capable of preferentially using all the freedom of the array pattern to lower the antenna gain in the direction of the low-rate user for downlink communications to the mobile station system. Therefore, it is possible to attain a transmission directivity for allowing a signal to be transmitted at a large power level to a mobile station system as a transmission partner, and also allowing a signal to be transmitted at a small power level to a relatively interference-susceptible low-rate user. Consequently, the interference imposed on the low-rate user can be lowered, preventing the reception characteristics of the low-rate user from being deteriorated by interference.

When the CDMA base station system receives a signal transmitted from a mobile station system as a transmission partner via a plurality of paths, the CDMA base station system preferably selects a signal whose average power is the greatest from signals received via the plural paths, i.e., a signal received via a path whose power loss is minimum, as a reference signal. Consequently, the CDMA base station system is capable of calculating best transmission weights to achieve an optimum transmission directivity. More specifically, if a signal whose average reception power is the greatest is selected as a reference signal from multipath signals produced by RAKE reception, then since the effect of power variations in a short time due to fading can be removed by averaging over a time duration, the difference between propagation path conditions for uplink and downlink communications can substantially be suppressed, so that a signal via a path whose propagation loss or shadowing is minimum can be selected as a reference signal.

If only a mobile station system which is more resistant to interference than a mobile station system as a transmission partner is present in a communication range of the CDMA base station system, or if the total number of signals other than a signal selected as a reference signal, i.e., the number equal to the total number of received signals minus 1, is within the freedom of the array pattern, then the interference imposed on the relatively interference-resistant mobile station system can be reduced by selecting only signals (multipath signals other than the reference signal) received from the mobile station system as a transmission partner as compensation-free signals mh(k).

Operation of the CDMA base station system when a mobile station system as a transmission partner of the CDMA base station system is a low-rate user will be described below. The processing sequence carried out by the CDMA base station system is the same as the processing sequence shown in FIG. 2, and will not be described in detail below.

A signal whose average power is the greatest is selected as an identification symbol s(k) from low-rate user signals received via a plurality of paths from a mobile station system as a transmission partner. Signals (multipath signals) other than a signal selected as a reference signal from the low-rate user signals received via the plural paths from the mobile station system as a transmission partner, and signals (including multipath signals) received from all other mobile station systems which communicate at communication rates higher than the communication rate of the mobile station system as a transmission partner are selected as compensation-free signals mh(k).

By selecting such a reference signal r(k) compensation-free signals mh(k), the CDMA base station system can preferentially use all the freedom of the array pattern to lower the antenna gain in the directions of all the users other than the mobile station system as a transmission partner for downlink communications to the mobile station system. Therefore, it is possible to attain a transmission directivity for allowing a signal to be transmitted at a large power level to the mobile station system as a transmission partner, and also allowing a signal to be transmitted at a small power level to other relatively interference-susceptible low-rate users.

If the total number of signals other than a signal selected as a reference signal, i.e., the number equal to the total number of received signals minus 1, is within the freedom of the array pattern, then the interference imposed on the relatively interference-resistant mobile station system can be reduced by selecting only signals (multipath signals other than the reference signal) received from the mobile station system as a transmission partner as compensation-free signals mh(k).

A mode of operation in which both the CDMA base station system and the mobile station systems perform a transmission power control process will be described below.

For illustrative purposes, a relatively large distance to the CDMA base station system is referred to as a "long distance", and a relatively small distance to the CDMA base station system is referred to as a "short distance". The transmission power of a signal (a long-distance user signal) transmitted from the CDMA base station system to a long-distance mobile station system (a long-distance user) is greater than the transmission power of a signal (a short-distance user signal) transmitted from the CDMA base station system to a short-distance mobile station system (a short-distance user). Therefore, the long-distance user is more resistant to interference, i.e., less susceptible to interference, than the short-distance user.

In the transmission power control process, a mobile station system as a transmission partner of the CDMA base station system may possibly be either a long-distance user or a short-distance user. These two alternatives will be described below.

Operation of the CDMA base station system when a mobile station system as a transmission partner of the CDMA base station system is a long-distance user will be described below. The processing sequence carried out by the CDMA base station system is the same as the processing sequence shown in FIG. 2, and will not be described in detail below.

A signal whose average power is the greatest is selected as an identification symbol s(k) from long-distance user signals received via a plurality of paths from a mobile station system as a transmission partner. Signals (multipath signals) other than a signal selected as a reference signal from the long-distance user signals received via the plural paths from the mobile station system as a transmission partner, and signals (including multipath signals) received from all other mobile station systems which communicate with the CDMA base station system at a distance greater than the distance to the mobile station system as a transmission partner are selected as compensation-free signals mh(k).

By selecting such a reference signal r(k) compensation-free signals mh(k), the CDMA base station system can preferentially use all the freedom of the array pattern to lower the antenna gain in the direction of the short-distance user for downlink communications to the mobile station system. Therefore, it is possible to attain a transmission directivity for allowing a signal to be transmitted at a large power level to the mobile station system as a transmission partner, and also allowing a signal to be transmitted at a small power level to the relatively interference-susceptible short-distance user.

If only a mobile station system which is spaced a longer distance than a mobile station system as a transmission partner is present in a communication range of the CDMA base station system, or if the total number of signals other that a signal selected as a reference signal, i.e., the number equal to the total number of received signals minus 1, is within the freedom of the array pattern, then the interference imposed on the relatively interference-resistant mobile station system can be reduced by selecting only signals (multipath signals other than the reference signal) received from the mobile station system as a transmission partner as compensation-free signals mh(k).

Operation of the CDMA base station system when a mobile station system as a transmission partner of the CDMA base station system is a short-distance user will be described below. The processing sequence carried out by the CDMA base station system is the same as the processing sequence shown in FIG. 2, and will not be described in detail below.

A signal whose average power is the greatest is selected as an identification symbol s(k) from short-distance user signals received via a plurality of paths from a mobile station system as a transmission partner. Signals (multipath signals) other than a signal selected as a reference signal from the short-distance user signals received via the plural paths from the mobile station system as a transmission partner, and signals (including multipath signals) received from all other mobile station systems which communicate with the CDMA base station system at a distance greater than the distance to the mobile station system as a transmission partner are selected as compensation-free signals mh(k).

By selecting such a reference signal r(k) compensation-free signals mh(k), the CDMA base station system can preferentially use all the freedom of the array pattern to lower the antenna gain in the directions of all short-distance users other than the mobile station system as a transmission partner for downlink communications to the mobile station system. Therefore, it is possible to attain a transmission directivity for allowing a signal to be transmitted at a large power level to the mobile station system as a transmission partner, and also allowing a signal to be transmitted at a small power level to other relatively interference-susceptible short-distance users.

If the total number of signals other than a signal selected as a reference signal, i.e., the number equal to the total number of received signals minus 1, is within the freedom of the array pattern, then the interference imposed on the relatively interference-resistant mobile station system can be reduced by selecting only signals (multipath signals other than the reference signal) received from the mobile station system as a transmission partner as compensation-free signals mh(k).

In the CDMA base station system according to the present embodiment, the reception system 3 and the respreader 4 detect a signal received from a high-rate user or long-distance user as a transmission partner as a reference signal r(k), and hence provide a reference signal detecting means for detecting, as a reference signal, a signal received from a mobile station system as a transmission partner corresponding to a transmission power that is equal to or higher than a predetermined threshold value. The predetermined threshold value may be any arbitrary value. For example, the threshold value may be set to a value (hereinafter referred to as a "first threshold value") that divides a transmission power corresponding to a relatively interference-resistant mobile station system and a transmission power corresponding to a relatively interference-susceptible mobile station system from each other.

In the CDMA base station system according to the present embodiment, furthermore, the reception system 3 and the respreader 4 detect a signal received from a low-rate user or short-distance user as a transmission partner as a reference signal r(k), and hence provide a reference signal detecting means for detecting, as a reference signal, a signal received from a mobile station system as a transmission partner corresponding to a transmission power that is smaller than a predetermined threshold value. The predetermined threshold value may be any arbitrary value. For example, the threshold value may be set to the same value as the first threshold value.

The CDMA base station system according to the present embodiment is used for communications in a multipath environment where a spread signal transmitted from a mobile station system as a transmission partner is received via a plurality of paths. The above reference signal detecting means detects, as a reference signal, a signal whose reception power is the greatest among signals received from the mobile station system as a transmission partner via the plural paths.

In the CDMA base station system according to the present embodiment, the reception system 3 and the respreader 5 detect signals received from other mobile station systems corresponding to transmission powers equal to or higher than the transmission power corresponding to a high-rate user or long-distance user as a transmission partner as compensation-free signals mh(k), and hence provide a compensation-free signal detecting means for detecting, as compensation-free signals, signals received from the other mobile station systems corresponding to the transmission powers which are higher than the transmission power corresponding to the mobile station system as a transmission partner.

In the CDMA base station system according to the present embodiment, the reception system 3 and the respreader 5 detect signals received from other mobile station systems corresponding to transmission powers higher than the transmission power corresponding to a low-rate user or short-distance user as a transmission partner as compensation-free signals mh(k), and hence provide a compensation-free signal detecting means for detecting, as compensation-free signals, signals received from the other mobile station systems corresponding to the transmission powers that are higher than the transmission power corresponding to the mobile station system as a transmission partner.

The CDMA base station system according to the present embodiment is used for communications in a multipath environment as described above. The above compensation-free signal detecting means detects signals other than a signal detected as a reference signal among signals received via a plurality of paths from the mobile station system as a transmission partner, as being included in compensation-free signals. If multipath signals are received via a plurality of paths from a mobile station system other than the mobile station system as a transmission partner, then the compensation-free signal detecting means detect all corresponding multipath signals as compensation-free signals.

In the CDMA base station system according to the present embodiment, the transmission weight determining unit D and the weight calibrator 11 calculate transmission weights based on the reference signal r(k) and the compensation-free signals mh(k), and the multiplier 12 and the RF transmitter 13 transmit a spread signal to a mobile station system as a transmission partner from the antennas A1–AN using the calculated transmission weights, thus providing a transmission means for calculating transmission weights based on reception weights of the antennas in order to reduce the reception level of another signal than the detected reference signal and the detected compensation-free signals and increase the reception level of the reference signal, and transmitting a spread signal to the mobile station system as a transmission partner using the calculated transmission weights.

The error signal e(k) corresponds to the other signal.

The controlling weights $\omega_1$–$\omega_N$ correspond to reception weights. The reception weights (the controlling weights $\omega_1$–$\omega_N$) are calculated in order to calculate transmission weights, and may not necessarily be used for actual signal reception.

For signal reception, the CDMA base station system controls the reception directivity of the adaptive array antenna using optimum reception weights for reception. For signal transmission, the CDMA base station system controls the reception directivity of the adaptive array antenna by calculating transmission weights optimum for signal transmission, rather than by using transmission weights based on the reception weights used for signal reception.

In a preferred mode of an actual signal reception process carried out by the reception system 3 of the CDMA base station system, a signal whose reception power is the greatest among signals received via a plurality of paths from a mobile station system as a reception partner is detected as a received reference signal, reception weights of respective antennas are calculated in order to reduce the reception level of another received signal than the detected received reference signal and increase the reception level of the received reference signal, and the signal from the mobile station system as a reception partner is received using the calculated reception weights.

In the present embodiment, best transmission weights are calculated according to the MMSE control process. However, transmission weights used for signal transmission may not necessarily be best transmission weights insofar as they are capable of lowering the interference imposed on a relatively interference-susceptible mobile station system to a practically effective level.

The CDMA base station system with the above means receives a spread signal transmitted from a mobile station system with a plurality of antennas, and imparts transmission weights to the respective antennas to control the overall directivity of the antennas for transmitting a spread signal to a mobile station system as a transmission partner with a transmission power corresponding to the mobile station system.

The result of a simulation of a transmission directivity pattern realized by the CDMA base station system according to the present embodiment will be described below, and advantages achieved by the CDMA base station system according to the present embodiment as compared with a conventional system will be described below.

In the simulation, a radio communication system made up of the CDMA base station system and the mobile station systems carries out a multirate service, and a mobile station system as a transmission partner of the CDMA base station system is a high-rate user. However, similar advantages can be obtained if a mobile station system as a transmission partner is a low-rate user. In addition, similar advantages can also be obtained if both the CDMA base station system and the mobile station systems perform a transmission power control process and a mobile station system as a transmission partner of the CDMA base station system is a long-distance user or a mobile station system as a transmission partner of the CDMA base station system is a short-distance user.

Figure 3:
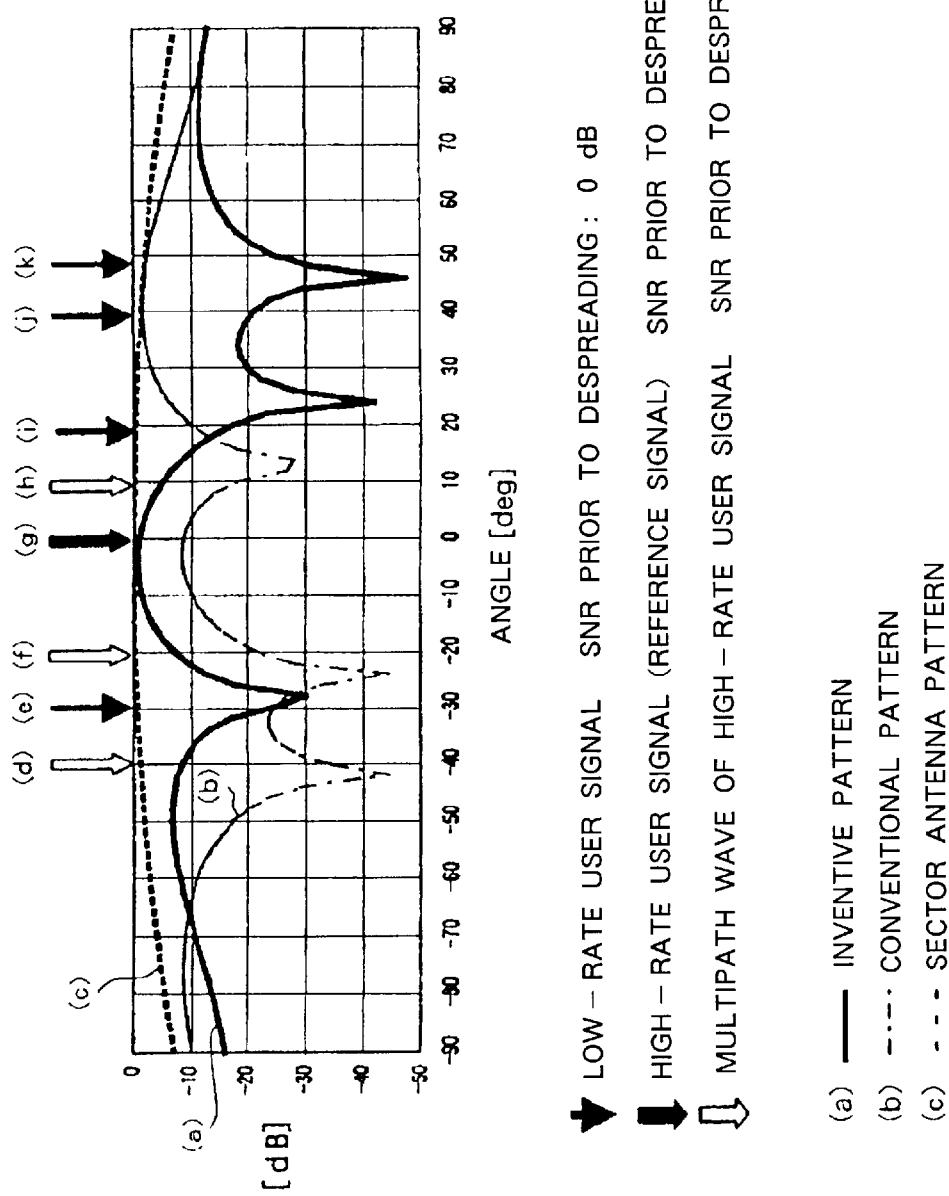
FIG. 3 is a diagram showing the result of a simulation of a directivity pattern realized by the CDMA base station system.

FIG. 3 shows the result of a simulation of a transmission directivity pattern when a multirate service is carried out and a mobile station system as a transmission partner of the CDMA base station system is a high-rate user.

It is assumed in the simulation that the CDMA base station system is associated with a base station with a large antenna height and the angular extent of each signal is sufficiently small. It is also assumed in the simulation that the total number N of the antennas A1–AN of the CDMA base station system is four, and those four antennas A1–AN make up a linear adaptive array antenna having four elements spaced by a half-wavelength interval. With such an antenna arrangement, the fading correlation between the antennas is 1, and the characteristic evaluation is made possible by a directivity pattern.

In this simulation, it is assumed that there are two communication rates, e.g., "high rate" and "low rate", and four (four paths) high-rate user signals and four (four paths) low-rate user signals arrive at the CDMA base station system. It is also assumed in the simulation that the four high-rate user signals are multipath signals transmitted and received by the same high-rate user, and the transmission power with which to transmit a signal from the CDMA base station system to the high-rate user is 18 dB higher than the transmission power with which to transmit a signal from the CDMA base station to the low-rate user.

In the graph shown in FIG. 3, a horizontal axis represents an angle [deg] as viewed from the CDMA base station system, for example, and a vertical axis represents the power level [dB] of a signal transmitted at the angle. In the simulation, a high-rate user signal arriving at the angle of 0° is selected as a reference signal.

The graph shown in FIG. 3 illustrates a simulated transmission directivity pattern (a) of the adaptive array antenna which is realized by the CDMA base station system (indicated as "inventive pattern"), a simulated transmission directivity pattern (b) of the adaptive array antenna which is realized by a conventional CDMA base station system (indicated as "conventional pattern"), and a simulated transmission directivity pattern (c) which is realized by a CDMA base station system using a conventional sector antenna (indicated as "sector antenna pattern").

In the graph shown in FIG. 3, the angle of the high-rate user signal selected as the reference signal is indicated by (g), the angles of three high-rate user signals other than the high-rate user signal selected as the reference signal are indicated respective by (d), (f), and (h), and the angles of four low-rate user signals are indicated respective by (e), (i), (j), and (k).

As shown in FIG. 3, the CDMA base station system according to the present embodiment can transmit a signal at a high antenna gain at the angle of the high-rate user signal selected as the reference signal, and can lower the antenna gains at angles of the low-rate user signals that are relatively susceptible to interference. Therefore, the CDMA base station system can lower the interference imposed on the low-rate users. Since the CDMA base station system according to the present embodiment does not use the freedom of the array pattern to direct nulls to angles (multipath directions) of high-rate user signals other than the high-rate user signal selected as the reference signal, the CDMA base station system can use the freedom of the array pattern greatly to lower the interference imposed on the relatively interference-susceptible low-rate users, and hence can effectively use the freedom of the array pattern.

The simulated transmission directivity pattern (a) of the adaptive array antenna which is realized by the CDMA base station system according to the present embodiment is a transmission directivity pattern obtained using the Wiener solution of the weight vector W represented by the equation (3) above.

The simulated transmission directivity pattern (b) of the adaptive array antenna which is realized by the conventional CDMA base station system is a transmission directivity pattern obtained using the Wiener solution of the weight vector in the case where the MMSE control process is carried out while the high-rate user signals other than the high-rate user signal selected as the reference signal remain in the error signal e(k). According to the conventional transmission directivity pattern, since the freedom of the array pattern is also used to lower the antenna gain at the angles of the high-rate user signals, the elimination of the interference imposed on the relatively interference-susceptible low-rate users is insufficient.

FIG. 4 shows the result of a simulation of interference reductions IS in the directions of low-rate user signals achieved by the three transmission directivity pattern achieved by the respective CDMA base station systems shown in FIG. 3, i.e., the inventive pattern, the conventional pattern, and the sector antenna pattern. The interference reduction IS is defined by the following equation (6):

$$IS = GL/Gh \qquad (6)$$

where Gh represents a relative antenna gain at the angle of the high-rate user signal selected as the reference signal and GL represents a relative antenna gain at the angle of each low-rate user signal.

The above interference reduction IS indicates the strength of relative interference imposed on the low-rate user signals by the high-rate user signal transmitted from the CDMA base station system to the high-rate user as a transmission partner. The smaller the interference reduction IS, the greater the reduction of the interference imposed on the low-rate user signals.

As indicated by the table shown in FIG. 4, the CDMA base station system according to the present embodiment is capable of reducing the interference reduction IS in the directions of all the low-rate user signals, i.e., lowering the interference imposed on the relatively interference-susceptible low-rate users, compared with the conventional CDMA base station system.

Figure 5:
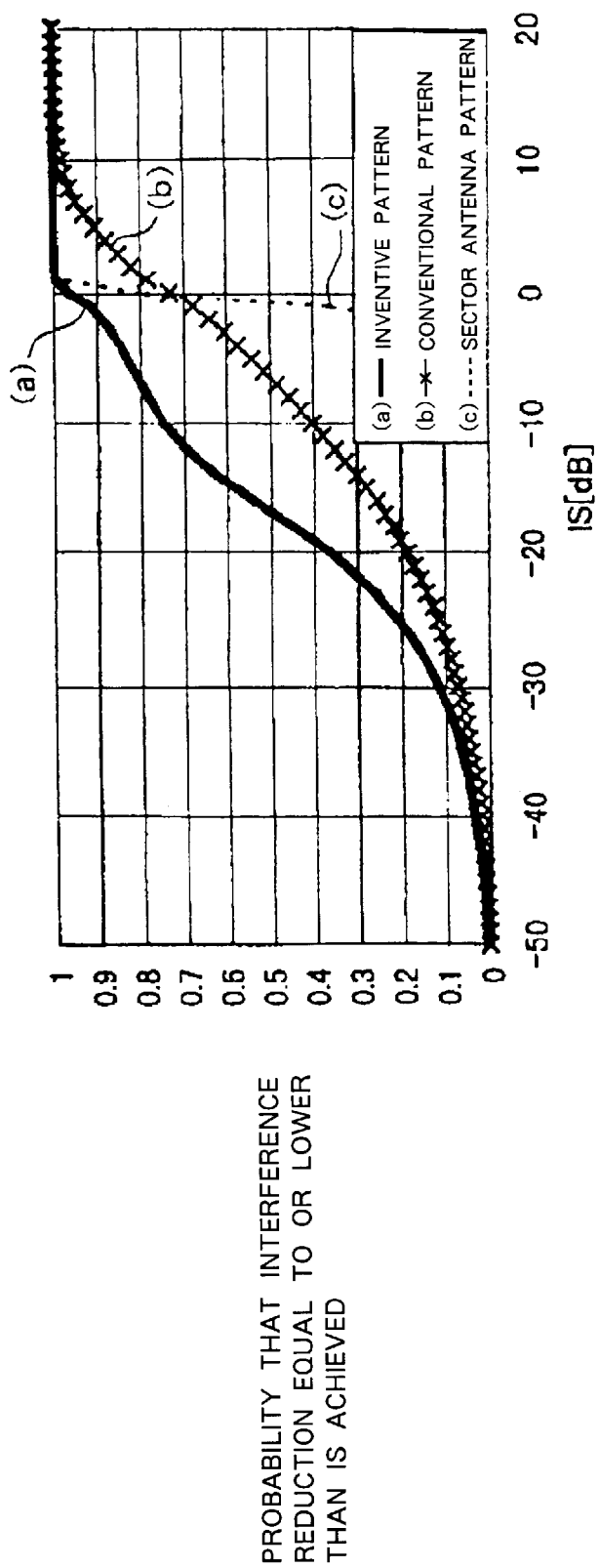
FIG. 5 is a diagram showing the result of a simulation of cumulative frequency distributions of interference reductions.

FIG. 5 shows the result of a simulation of cumulative frequency distributions of interference reductions IS according to the three transmission directivity pattern achieved by the respective CDMA base station systems.

The graph shown in FIG. 5 illustrates a simulated cumulative frequency distribution (a) achieved by the CDMA base station system (indicated as "inventive distribution"), a simulated cumulative frequency distribution (b) achieved by a CDMA base station system using a conventional adaptive array antenna (indicated as "conventional distribution"), and a simulated cumulative frequency distribution (c) achieved by a CDMA base station system using a conventional sector antenna (indicated as "sector antenna distribution").

The cumulative frequency distributions shown in FIG. 5 were obtained by a simulation in which the angle of each signal arriving at the CDMA base station system was randomly changed. In this simulation, four high-rate user signals and four low-rate user signals arrive at the CDMA base station system, as with the simulation which produced the result shown in FIG. 3, and the transmission power of the high-rate user signals and the transmission power of the low-rate user signals are the same as those in the simulation which produced the result shown in FIG. 3.

In the graph shown in FIG. 5, a horizontal axis represents the interference reduction IS [dB], and a vertical axis represents the probability that an interference reduction equal to or lower than the interference reduction IS represented by the horizontal axis is achieved. The graph shown in FIG. 5 indicates that the CDMA base station system according to the present embodiment is capable of reducing the interference imposed on the relatively interference-susceptible low-rate users, compared with the conventional CDMA base station system.

The CDMA base station system according to the present invention may have any number of antennas insofar as they are plural.

The processing carried out by the reference signal detecting means, the compensation-free signal detecting means, and the transmission means of the CDMA base station system may be controlled by a control program run by a hardware resource including a processor, a memory, etc., or each of the above means for carrying out the above processing may comprise an independent hardware circuit.

The present invention may be recognized as a computer-readable recording medium such as a floppy disk, a CD-ROM, or the like which stores the above control program. The processing according to the present invention can be performed by loading the control program from the recording medium into a computer and executing the control program with a processor in the computer.

If the various processes carried out by the transmission weight determining unit D of the CDMA base station system according to the embodiment shown in FIG. 1 are executed using software, then the CDMA base station system shown in FIG. 1 can be constructed without adding new hardware to the conventional CDMA base station system.

As described above, the CDMA base station system according to the present invention receives a spread signal transmitted from a mobile station system with a plurality of antennas and gives transmission weights respectively to the antennas to control the overall directivity of the antennas, and, for transmitting a spread signal to a mobile station system as a transmission partner with a transmission power corresponding to the mobile station system, detects, as a reference signal, a signal received from the mobile station system as a transmission partner corresponding to a transmission power equal to or greater than a predetermined threshold value, and detects, as compensation-free signals, signals received from other mobile station systems corresponding to a transmission power equal to or greater than the transmission power corresponding to the mobile station system as a transmission partner, calculates transmission weights based on reception weights of the antennas to lower the reception levels of other signals than the reference signal and the compensation-free signals and to increase the reception level of the reference signal, and transmits the spread signal to the mobile station system as a transmission partner using the calculated transmission weights. Therefore, the CDMA base station system is capable of transmitting a signal at a high transmission level to the mobile station system as a transmission partner, and reducing the interference imposed on relatively interference-susceptible mobile station systems.

For performing the same signal transmission as described above, the CDMA base station system according to the present invention detects, as a reference signal, a signal received from a mobile station system as a transmission partner corresponding to a transmission power smaller than a predetermined threshold value, and detects, as compensation-free signals, signals received from other mobile station systems corresponding to a transmission power greater than the transmission power corresponding to the mobile station system as a transmission partner, and transmits a spread signal to the mobile station system as a transmission partner using transmission weights calculated in the same manner as described above, with signals other than the reference signal and the compensation-free signals being used as other signals. Therefore, the CDMA base station system can offer the same advantages as described above.

Furthermore, if the CDMA base station system according to the present invention is used in a multipath environment where a spread signal transmitted from a mobile station system as a transmission partner is received via a plurality of paths, then the CDMA base station system detects, as a reference signal, a signal whose reception power is the greatest among signals received from the mobile station system as a transmission partner via the plural paths, and detects signals other than the signal detected as a reference signal among signals received via the plural paths from the mobile station system as a transmission partner, as being included in compensation-free signals. Therefore, the CDMA base station system can select a signal received via the best path as a reference signal, and can calculate the best transmission weights for use in signal transmission.

Moreover, if the CDMA base station system according to the present invention is used in a multipath environment where a spread signal transmitted from a mobile station system as a reception partner is received via a plurality of paths, then the CDMA base station system detects, as a received reference signal, a signal whose reception power is the greatest among signals received from the mobile station system as a reception partner via the plural paths, and receives a spread signal from the mobile station system as a reception partner using reception weights of the antennas to reduce the reception level of received signals other than the detected received reference signal and increase the reception level of the received reference signal. Therefore, the CDMA base station system can calculate the best reception weights for use in signal reception, as with the above transmission weights.

Although a certain preferred embodiment of the present invention has been shown and described in detail, it should be understood that various changes and modifications may be made therein without departing from the scope of the appended claim.

What is claimed is:

1. A CDMA base station system for receiving a spread signal transmitted from a mobile station system with a plurality of antennas, imparting transmission weights to the respective antennas for controlling the overall directivity of the antennas, and transmitting a spread signal to the mobile station system as a transmission partner with a transmission power corresponding to the mobile station system as the transmission partner, comprising:
   a reference signal detecting means for detecting, as a reference signal, a signal received from the mobile station system as the transmission partner corresponding to a transmission power equal to or higher than a predetermined threshold value;
   a compensation-free signal detecting means for detecting, as compensation-free signals, signals received from other mobile station systems corresponding to transmission powers which are higher than the transmission power corresponding to the mobile station system as the transmission partner; and
   a transmission means for calculating transmission weights based on reception weights of the antennas in order to reduce the reception level of another signal than the detected reference signal and the detected compensation-free signals and increase the reception level of the reference signal, and transmitting the spread signal to the mobile station system as the transmission partner using the calculated transmission weights.

2. A CDMA base station system according to claim 1, for communications in a multipath environment where the spread signal transmitted from the mobile station system as the transmission partner is received via a plurality of paths, wherein said reference signal detecting means comprises a means for detecting, as the reference signal, a signal whose reception power is maximum among signals received from the mobile station system as the transmission partner is received via said paths, and said compensation-free signal detecting means comprises a means for detecting signals other than the signal detected as the reference signal among signals received via said paths from the mobile station system as the transmission partner, as being included in the compensation-free signals.

3. A CDMA base station system according to claim 2, wherein said multipath environment comprises an environment where the spread signal transmitted from the mobile station system as a reception partner is received via a plurality of paths, further comprising:
   a reception reference signal detecting means for detecting, as a reception reference signal, a signal whose reception power is maximum among signals received from the mobile station system as the reception partner is received via said paths; and
   a reception means for calculating reception weights of the respective antennas in order to reduce the reception level of another signal than the detected reception reference signal and increase the reception level of the reception reference signal, and receiving the spread signal from the mobile station system as the reception partner using the calculated reception weights.

4. A CDMA base station system according to claim 1, for use in a radio communication system for carrying out a multirate service, wherein the mobile station system as the transmission partner comprises a mobile station system for performing communications at a high communication rate, and the other mobile station systems corresponding to transmission powers which are higher than the transmission power corresponding to the mobile station system as the transmission partner comprise mobile station systems for performing communications at a communication rate equal to or higher than the communication rate of the mobile station system as the transmission partner.

5. A CDMA base station system according to claim 1, for use in a radio communication system for carrying out a transmission power control process with both said CDMA base station system and the mobile station systems, wherein the mobile station system as the transmission partner comprises a mobile station system spaced a large distance from said CDMA base station system, and the other mobile station systems corresponding to transmission powers which are higher than the transmission power corresponding to the mobile station system as the transmission partner comprise mobile station systems for performing communications with said CDMA base station system at a distance equal to or greater than the distance by which the mobile station system as the transmission partner is spaced from said CDMA base station system.

6. A CDMA base station system according to claim 1, for use in a radio communication system for carrying out a transmission power control process with both said CDMA base station system and the mobile station systems, wherein the mobile station system as the transmission partner comprises a mobile station system spaced a small distance from said CDMA base station system, and the other mobile station systems corresponding to transmission powers which are higher than the transmission power corresponding to the mobile station system as the transmission partner comprise mobile station systems for performing communications with said CDMA base station system at a distance greater than the distance by which the mobile station system as the transmission partner is spaced from said CDMA base station system.

7. A CDMA base station system for receiving a spread signal transmitted from a mobile station system with a plurality of antennas, imparting transmission weights to the respective antennas for controlling the overall directivity of the antennas, and transmitting a spread signal to the mobile station system as a transmission partner with a transmission power corresponding to the mobile station system as the transmission partner, comprising:

a reference signal detecting means for detecting, as a reference signal, a signal received from the mobile station system as the transmission partner corresponding to a transmission power smaller than a predetermined threshold value;

a compensation-free signal detecting means for detecting, as compensation-free signals, signals received from other mobile station systems corresponding to transmission powers which are higher than the transmission power corresponding to the mobile station system as the transmission partner; and a transmission means for calculating transmission weights based on reception weights of the antennas in order to reduce the reception level of another signal than the detected reference signal and the detected compensation-free signals and increase the reception level of the reference signal, and transmitting the spread signal to the mobile station system as the transmission partner using the calculated transmission weights.

8. A CDMA base station system according to claim 7, for communications in a multipath environment where the spread signal transmitted from the mobile station system as the transmission partner is received via a plurality of paths, wherein said reference signal detecting means comprises a means for detecting, as the reference signal, a signal whose reception power is maximum among signals received from the mobile station system as the transmission partner is received via said paths, and said compensation-free signal detecting means comprises a means for detecting signals other than the signal detected as the reference signal among signals received via said paths from the mobile station system as the transmission partner, as being included in the compensation-free signals.

9. A CDMA base station system according to claim 8, wherein said multipath environment comprises an environment where the spread signal transmitted from the mobile station system as a reception partner is received via a plurality of paths, further comprising:

a reception reference signal detecting means for detecting, as a reception reference signal, a signal whose reception power is maximum among signals received from the mobile station system as the reception partner is received via said paths; and a reception means for calculating reception weights of the antennas in order to reduce the reception level of another signal than the detected reception reference signal and increase the reception level of the reception reference signal, and receiving the spread signal from the mobile station system as the reception partner using the calculated reception weights.

10. A CDMA base station system according to claim 7, for use in a radio communication system for carrying out a multirate service, wherein the mobile station system as the transmission partner comprises a mobile station system for performing communications at a low communication rate, and the other mobile station systems corresponding to transmission powers which are higher than the transmission power corresponding to the mobile station system as the transmission partner comprise mobile station systems for performing communications at communication rate higher than the communication rate of the mobile station system as the transmission partner.

11. A CDMA base station system for imparting reception weights respectively to a plurality of antennas for controlling the overall directivity of the antennas, and receiving a spread signal transmitted from a mobile station system with the antennas, for communications in a multipath environment where the spread signal transmitted from the mobile station system as a reception partner is received via a plurality of paths, comprising:

a reception reference signal detecting means for detecting, as a reception reference signal, a signal whose reception power is maximum among signals received from the mobile station system as the reception partner is received via said paths; and a reception means for calculating reception weights of the respective antennas in order to reduce the reception level of another signal than the detected reception reference signal and increase the reception level of the reception reference signal, and receiving the spread signal from the mobile station system as the reception partner using the calculated reception weights.

* * * * *